(12) United States Patent
Morimitsu et al.

(10) Patent No.: US 7,277,583 B2
(45) Date of Patent: Oct. 2, 2007

(54) GAME SOFTWARE AND GAME MACHINE

(75) Inventors: Shinji Morimitsu, Tokyo (JP); Yuji Ogaito, Tokyo (JP)

(73) Assignee: Konami Corporation, Tokyo (JP)

( * ) Notice: Subject to any disclaimer, the term of this patent is extended or adjusted under 35 U.S.C. 154(b) by 616 days.

(21) Appl. No.: 10/839,458

(22) Filed: May 5, 2004

(65) Prior Publication Data
US 2005/0068313 A1 Mar. 31, 2005

(30) Foreign Application Priority Data
Sep. 25, 2003 (JP) ............................. 2003-333362

(51) Int. Cl.
*G06T 13/00* (2006.01)
(52) U.S. Cl. ...................... 382/203; 345/422
(58) Field of Classification Search ...................... None
See application file for complete search history.

(56) References Cited
U.S. PATENT DOCUMENTS
2002/0089515 A1* 7/2002 Yamamoto ................. 345/611

FOREIGN PATENT DOCUMENTS
JP 2001-175884 6/2001
JP 2002-197486 12/2002

* cited by examiner

*Primary Examiner*—Brian P. Werner
*Assistant Examiner*—Eueng-nan Yeh
(74) *Attorney, Agent, or Firm*—Duane Morris, LLP

(57) ABSTRACT

A first image producing program perspectively transforms each polygon in a virtual space onto a plane on the basis of a view position in order to produce a first image, and a second image producing program deteriorates a quality of the first image to produce the second image having the same size as the first image. A synthetic image producing program produces a display image with combination of the first and second images by applying semi-transparentizing processing to at least one of both first and second images so that each polygon of the first image can be displayed around a depth position of a gaze position and each polygon of the second image can be displayed as the polygon approaches at least one side of both front and rear sides concerning the gaze point.

4 Claims, 5 Drawing Sheets

GAME SOFTWARE AND GAME MACHINE

BACKGROUND OF THE INVENTION

The invention relates to game software for displaying a display image obtained by perspectively transforming polygons in a virtual space onto a plane and for displaying a gaze position at which a player should gaze. Particularly, the invention relates to game software for shading off images of polygons on a front side or a rear side of a gaze point.

"Game software" in the specification includes program itself and various kinds of data related to the program if necessary. It is not always necessary to relate "game software" to the data, but "game software" has always program. And, "the related various kinds of data" may be stored in a memory means, such as a ROM disc, together with the program. Furthermore, these data may be stored in an outside memory means so as to be freely read out through a communication medium means, such as the Internet.

In various kinds of recent games, many polygons are located in a virtual space, and a display image obtained by perspectively transforming the polygons onto a screen plane from a view point, that is, a so-called real-time three dimensional computer graphics, is displayed on a monitor so that a player can enjoy the game in a three dimensional space. In such a game for displaying a 3DCG, such as a game for taking aim at a target for getting it down, a gaze point at which a player should gaze ("the gaze point" hereinafter) may exist in the virtual space to be displayed on a screen.

When staring at a point in a three dimensional space, a person generally brings the depth thereof into focus and sees the objects on a front side and a rear side of the point dimly due to being out of focus. In a display image obtained by applying planar perspective transformation to the above-mentioned virtual space, but, a player does not dimly see (the image of) polygons on the front side and the rear side of the gaze position in the virtual space even if the player stares at the gaze position, such as an aim since the respective polygons are perspectively transformed onto the screen plane regardless of the depth direction and the monitor itself is almost planar. Due to the reasons, a real mood can not be given to a player, and such a game may lack an interest.

Then, the object of the invention is to provide game software for displaying an image obtained by shading off the polygons on at lest one side of both front and rear sides with respect to a gaze position in the virtual space.

SUMMARY OF THE INVENTION

The invention is game software for getting a computer to produce a display image by perspectively transforming many polygons located in a virtual space onto a plane on the basis of a view position so as to represent on a display and to produce a gaze position (such as SC) at which a player should gaze in the virtual space so as to represent on the display, comprising:

the game software having a program for functioning as the following means, comprising:

polygon locating means for locating the many polygons in the virtual space in response to an operation input by said player through an operation portion;

gaze position computing means for computing a depth position of the gaze position (such as SC) with respect to the view position;

first image producing means for perspectively transforming each polygon in the virtual space onto the plane on the basis of the view position in order to produce a first image;

second image producing means for deteriorating a quality of the first image produced by the first image producing means to produce a second image so as to have a size the same as the first image; and synthetic image producing means for applying semi-transparentizing processing to at least one of both the first and the second images so that each polygon of the first image can be displayed around the depth position of the gaze position (such as SC) which was computed by the gaze position computing means and each polygon of the second image can be displayed as the polygon approaches at least one side of a front side and a rear side concerning the gaze position (such as SC), and for combining the first and the second images so as to produce the display image.

According to this aspect of the invention, the second image producing means deteriorates the quality of the first image produced by the first image producing means and produces the second image so as to have the same size as the first image, and the synthetic image producing means produces the display image by applying semi-transparentizing processing on at least one of both the first and the second images so that (the image) of each polygon of the first image can be displayed around the depth position of the gaze point (such as SC) computed by the gaze position computing means and (the image) of each polygon of the second image can be displayed as the polygon approaches at least one of both the front and the rear sides concerning the gaze position (such as SC) and thereafter combining both images, thereby shading off (the image of) the polygon to be displayed as the polygon approaches at least one of both the front and the rear sides concerning the gaze position (such as SC). By doing so, reality can be given to the player, and pleasure of the game can increase.

Besides, the invention is the game software wherein the second image producing means reduces the first image so as to have a predetermined size and then recovers the reduced image in order to deteriorate the quality of the first image, and produces the second image having the same size as the first image.

According to this aspect of the invention, the second image producing means deteriorates the quality of the first image by reducing the first image so as to have a predetermined size and thereafter recovering it, and produces the second image having the same size as the first image, so that the second image obtained by deteriorating the quality of the first image can be produced without newly producing the second image. And, the second image can be relatively easily produced without widely increasing operation, thereby preventing execution speed of the game and drawing speed of the display image from lowering.

Besides, the invention is the game software according to claim 1 having a program for getting said computer to function as the following means; comprising:

Z-buffer means for computing a Z-value of each polygon as a depth direction from the view point on the basis of three-dimensional coordinates given to the virtual space, and for projectively transforming only polygons the Z-values of which are small onto a planar screen; and transparentizing means for determining a transparency according to the Z-value; the game software wherein the gaze position computing means computes the depth position of the gaze point (such as SC) with the Z-value, the first image producing means has coordinate transformation computing means for perspectively transforming the polygons onto the planar screen in such a way the the Z-value of the polygon, which is at the gaze point (such as SC), is transformed into one having no transparency and the Z-value of the polygon, which is bigger and/or smaller than one of the gaze point, is transformed into one gradually increasing transparency, starting from one having no transparency, and the synthetic image producing means combines the first image and the second image, the first image to which semi-transparentizing process being applied on the basis of the transformed Z-value of each polygon in order to produce the display image.

According to this aspect of the invention, the gaze position computing means computes the depth position of the gaze point (such as SC) with the Z-value, and the coordinate transformation computing means of the first image producing means perspectively transforms the polygons onto the planar screen in such a way that the Z-value of the polygon, which is the same as one of the gaze point (such as SC) is transformed into one having no transparency and the Z-value of the polygon, which is bigger and/or smaller than one of the gaze point, is transformed into one gradually increasing transparency, starting from one having no transparency. Therefore, the synthetic image producing means can apply semi-transparentizing processing to the first image 40-1 with the transparentizing means of the game machine although the Z-buffer means of the game machine can perspectively transform the respective polygons onto a plane, so that the display image can be relatively easily produced by combining the processed first image and the second image without widely increasing operation. Then, the executing speed of the game and the drawing speed of the display image can be prevented from lowering.

Besides, the invention is a game machine for producing a display image by perspectively transforming many polygons located in a virtual space onto a plane on the basis of a view position so as to represent on a display and for producing a gaze position (such as SC) at which a player should gaze in the virtual space so as to represent on the display, comprising:

polygon locating means for locating many polygons in the virtual space in response to an operation input by the player through an operation portion;

gaze position computing means for computing a depth position of the gaze position (such as SC) with respect to the view position;

first image producing means for perspectively transforming each polygon in the virtual space onto the plane on the basis of the view position in order to produce a first image;

second image producing means for deteriorating a quality of the first image produced by the first image producing means to produce a second image so as to have a size the same as the first image; and synthetic image producing means for applying semi-transparentizing processing to at least one of both the first and the second images so that each polygon of the first image can be displayed around the depth position of the gaze position (such as SC) which was computed by the gaze position computing means and each polygon of the second image can be displayed as the polygon approaches at least one side of a front side and a rear side concerning the gaze position (such as SC)

and for combining the first and the second images so as to produce the display image.

The number in parentheses shows the corresponding element in the drawings for the sake of convenience, accordingly, the present descriptions are not restricted and bound by the descriptions on the drawings.

DESCRIPTION OF THE PREFERRED EMBODIMENT

Figure 1:
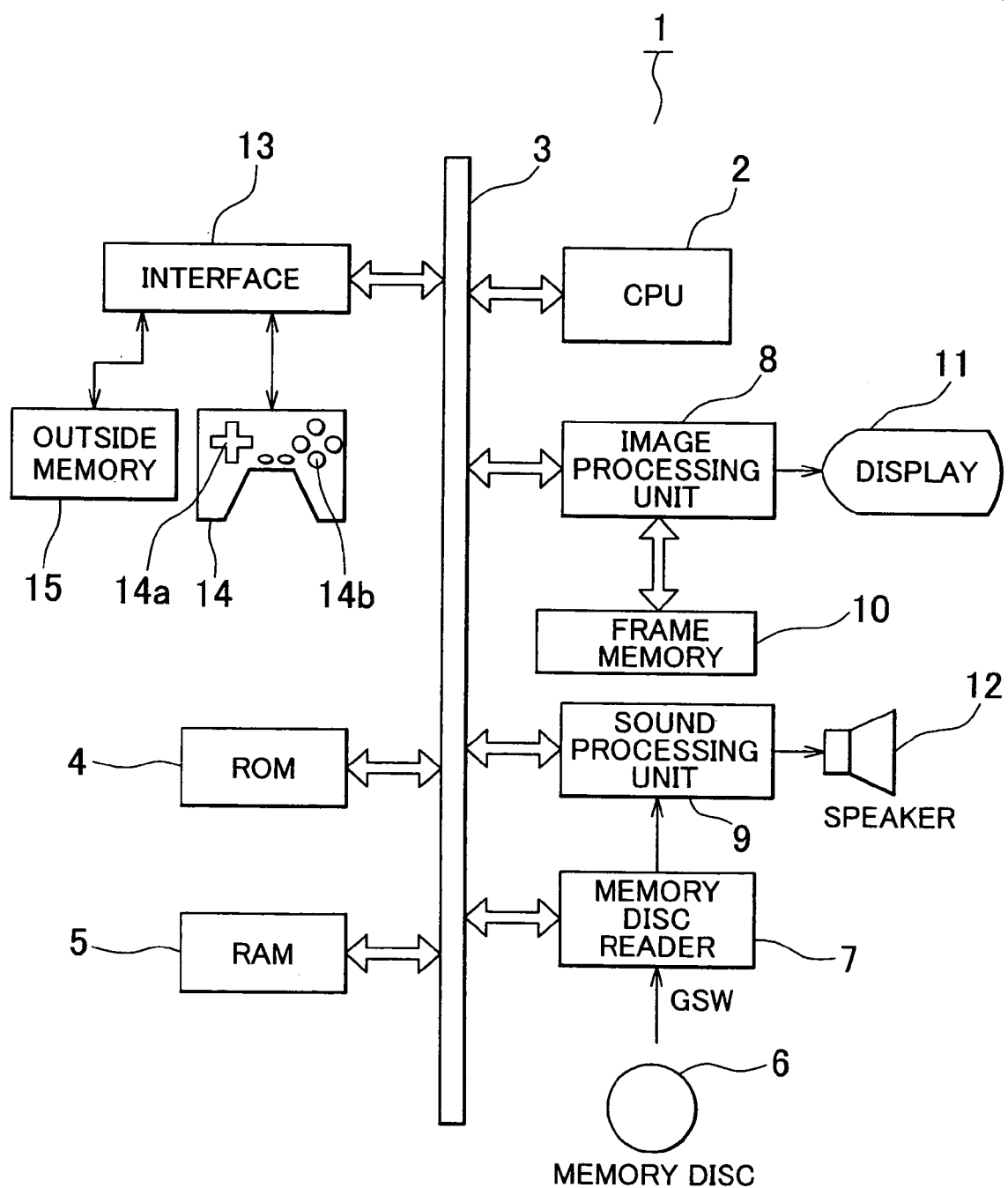
FIG. 1 is a block diagram showing a game machine according to the invention.

An embodiment of the invention is now explained, referring to appended drawings. FIG. 1 is a block diagram showing a game machine according to the invention.

As shown in FIG. 1, a game machine 1 as a game machine for home use which is an instance of a computer has a CPU 2 (computing portion ), main body of which is a microprocessor unit. A ROM 4 and a RAM 5 (memory portion) as main memories are connected with the CPU 2 through a bus 3. An operating system which is program necessary for controlling the whole actions of the game machine land data necessary for executing the operating system are stored in the ROM 4 in advance.

Game software GSW, which is read out of a memory disc 6 as an optical storage medium through a memory disc reader 7 and various kinds of data are memorized (stored) in the RAM 5.

And, an area for temporarily storing various kinds of information necessary for a progress of a game is set in the RAM 5 according to program read out of the memory disc 6. And, image data obtained by processing data through the CPU 2, the data being read out of the memory disc 6 is also stored in a predetermined video area secured in the RAM 5. A RAM dedicated for displaying may be separately provided in the game machine 1 or in another one. The memory disc 6 for supplying the game software GSW may be any memory disc, such as a CD-ROM, a DVD-ROM, and the other optical disc. Besides, the game software GSW may be provided with a semiconductor memory or the Internet.

An image processing unit 8 (computing portion, image outputting portion) and a sound processing unit 9, which are portions for outputting data to be represented, are connected with the CPU 2 through the bus 3. The image processing unit 8 reads image data out of the video area of the RAM 5 and draws a game screen on a frame memory 10, and converts the drawn image into a video signal for displaying on a display 11 (image displaying unit) so as to output it at a proper timing.

The sound processing unit 9 converts sound data in the memory disc 6 into a predetermined analog sound signal so as to output from a speaker 12. As the display 11 and the speaker 12, a home television receiver and a built-in speaker of the television receiver are generally used.

A controller 14 (input portion) and an outside memory 15 are attachably and detachably connected with the bus 3 through an interface 13. The controller 14 is provided with operation members such as a cross key 14a and a push button switch 14b for receiving an operation by a player.

A signal corresponding to the operation state of the operation members 14a, 14b is outputted from the controller 14 at a constant period (at sixty cycles per a second, for instance), and the CPU 2 judges the operation state of the controller 14 on the basis of the signal.

The outside memory 15 has a semiconductor element for rewriting and memorizing, and data for showing the progress of a game is stored therein according to an instruction of a player. The outside memory 15 may be provided as an element of a portable game machine (not shown) attachable to and detachable from the interface 13.

The computer through which the game software according to the invention functions is the game machine 1 as a game machine for home use. The game machine 1 is not a device dedicated for a game, but may be a device for playing back general music and images stored in a storage medium. Furthermore, any one, such as a personal computer and a mobile phone, is available as long as game software can function therethrough.

Figure 2:
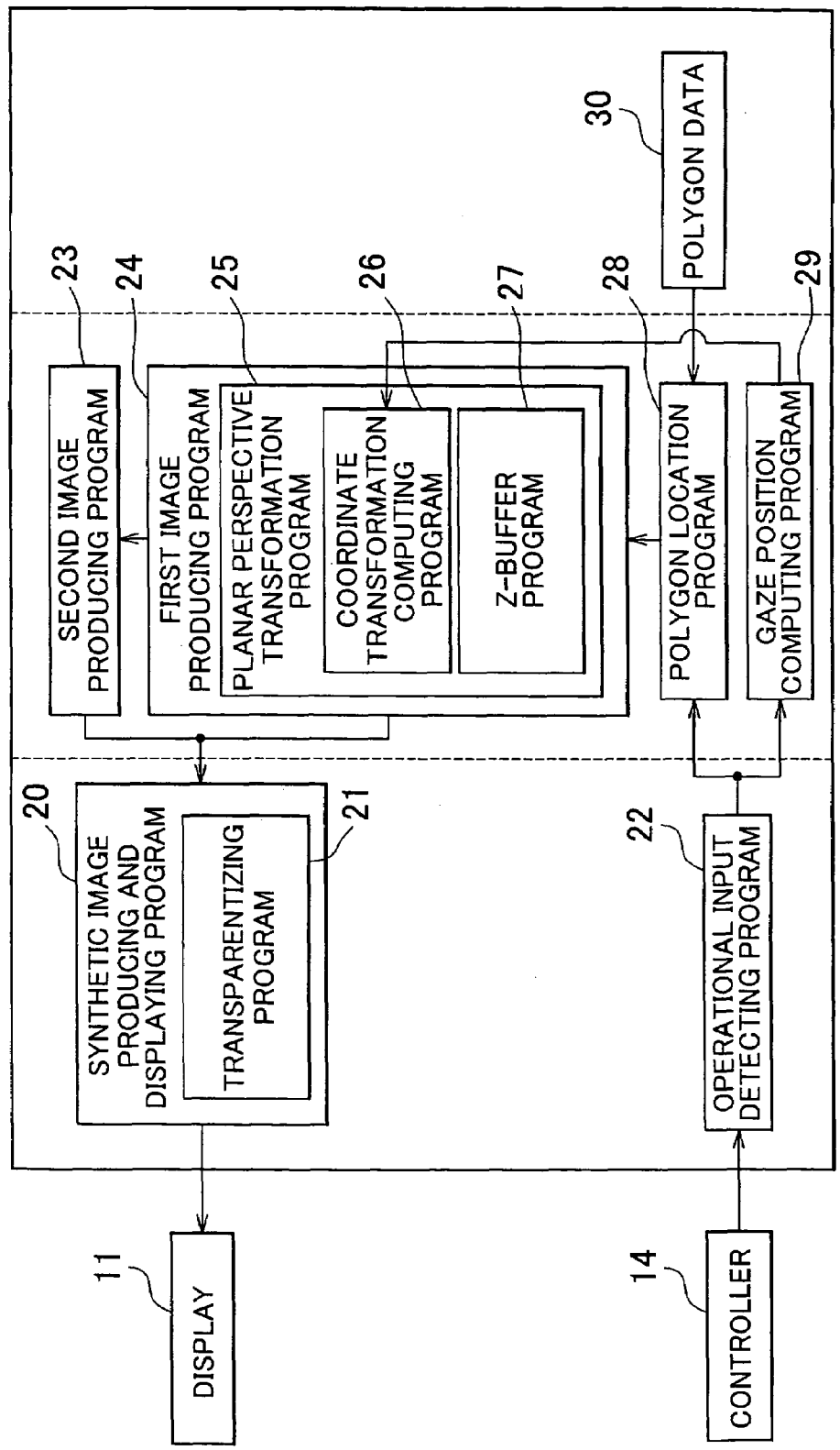
FIG. 2 is a block diagram schematically showing game software GSW according to the invention.
Figure 3:
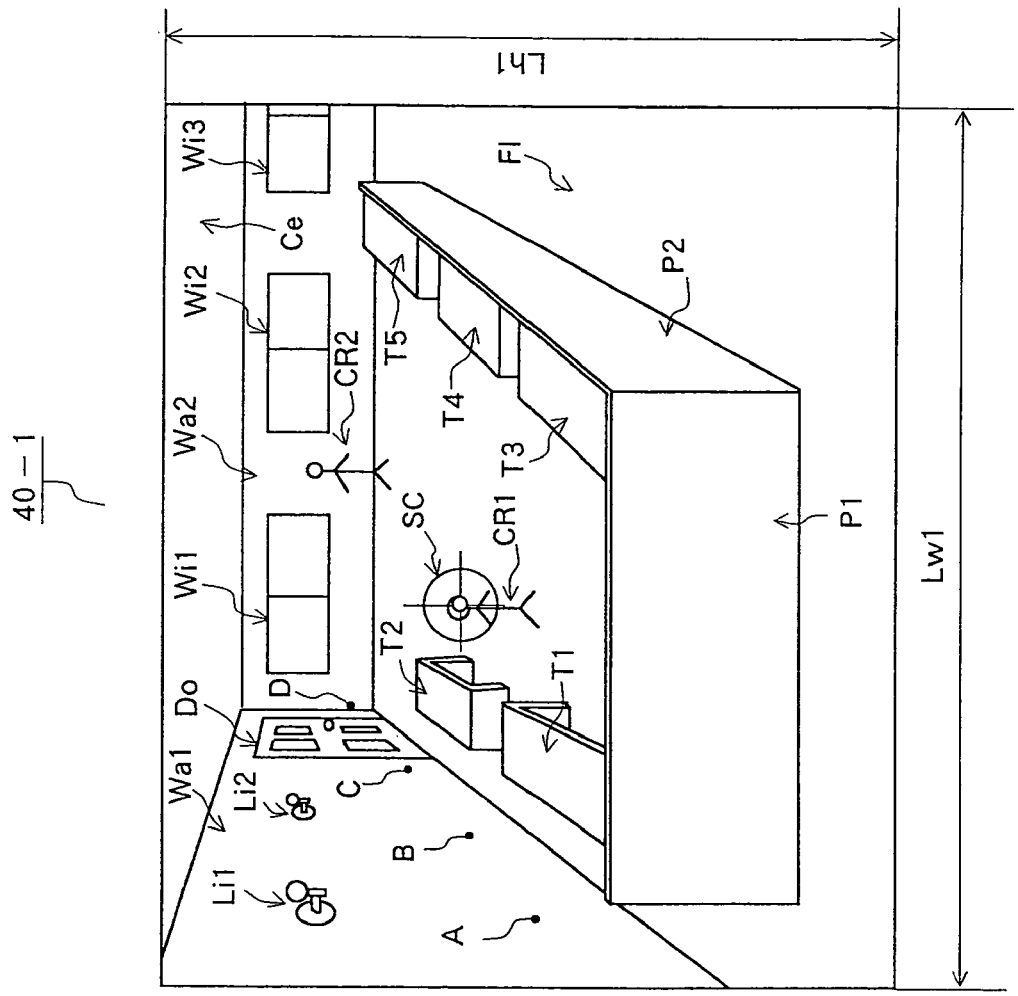
FIG. 3 is a view showing a first image.
Figure 4:
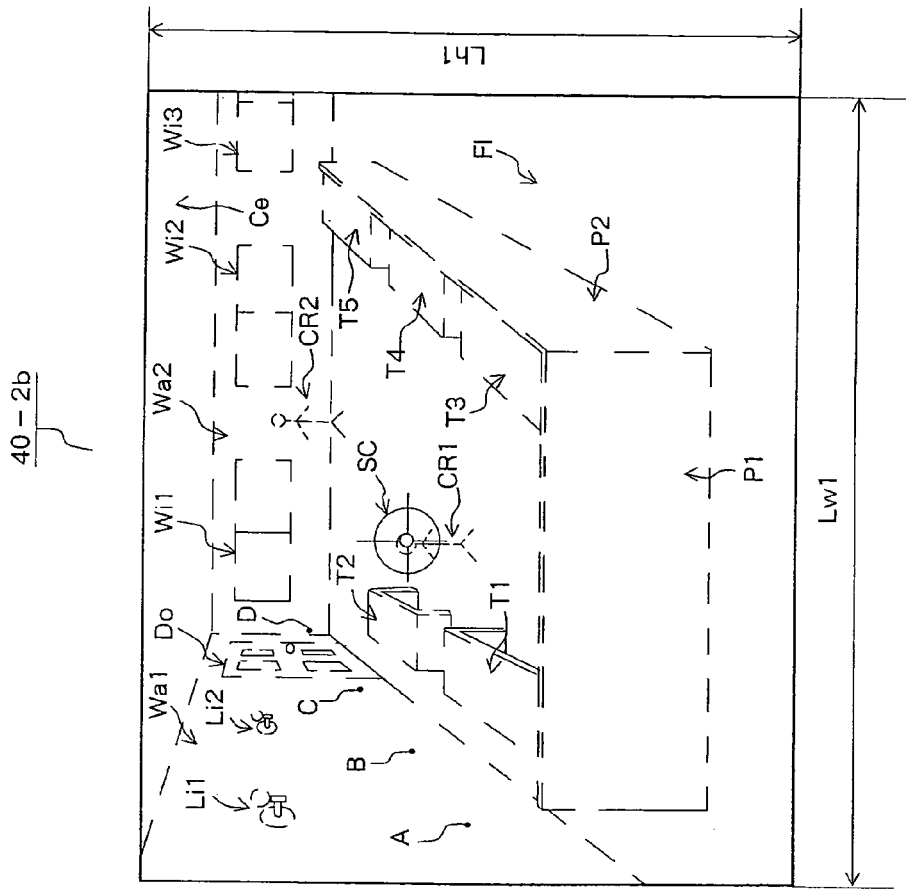
FIG. 4 is an explanation view at the time when producing a second image wherein (a) is a view showing a reduced first image and (b) is a view showing the second image obtained by recovering (a)
Figure 4:
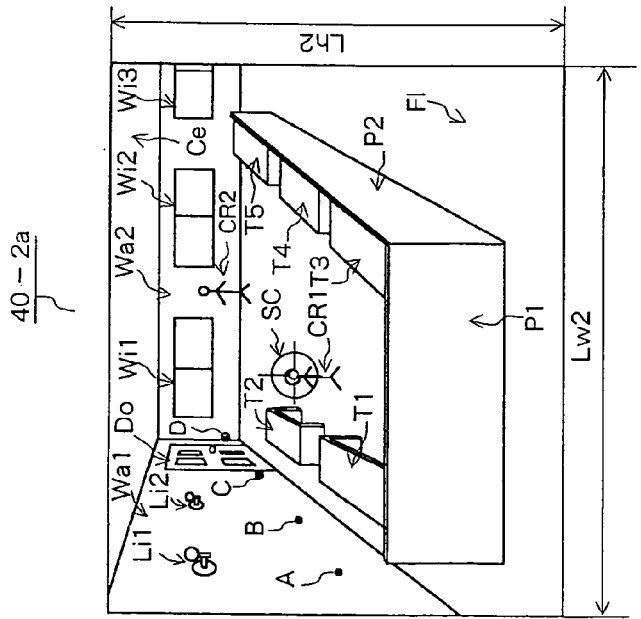
Figure 5:
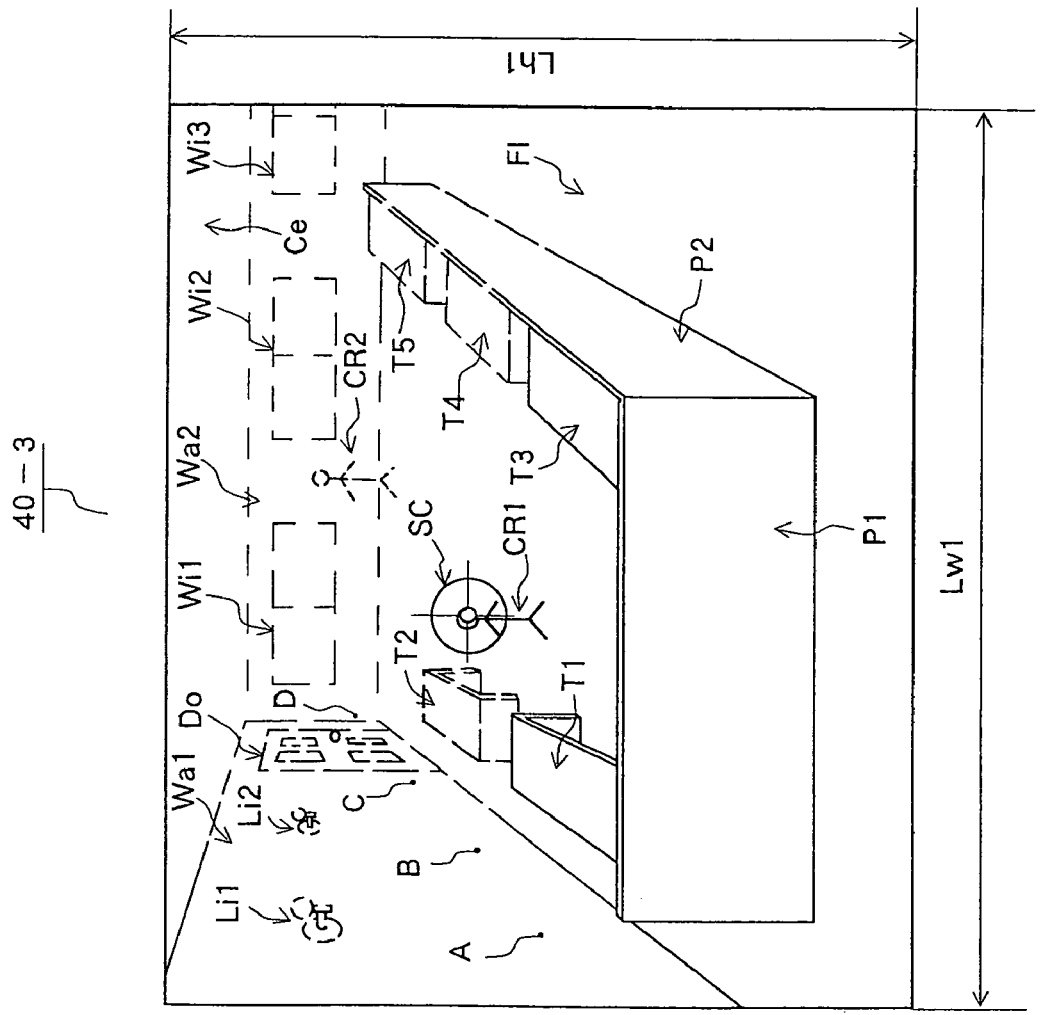
FIG. 5 is a view showing a display image obtained by combining the first image and the second image.

The game software GSW according to the invention is now explained, referring to FIGS. 2 through 5. FIG. 2 is a block diagram schematically showing the game software GSW according to the invention, FIG. 3 is a view showing a first image, FIG. 4 is an explanation view at the time when producing a second image wherein (a) is a view showing a reduced first image and (b) is a view showing the second image obtained by recovering (a), and FIG. 5 is a view showing a display image obtained by combining the first image and the second image.

Many programs (means) and data files generally form the game software GSW. But, only important parts relating to the invention are schematically shown and many programs and data for another actions and computation are not shown in FIG. 2 for easy understanding. A broken line in FIGS. 4 and 5 shows deterioration of image, that is, a shaded off state.

As shown in FIG. 2, the game software GSW is comprised of a synthetic image producing and displaying program 20 through which a transparentizing program 21 functions, an operational input detecting program 22, a second image producing program 23, a first image producing program 24 having a planar perspective transformation program 25 through which a coordinate transformation computing program 26 and a Z-buffer program 27 function, a polygon location program 28, a gaze position computing program 29 and a polygon data 30 so that the game machine 1 can function.

FIG. 2 conveniently shows that the transparentizing program 21 and the Z-buffer program 27 equipping the ROM 4 or the image processing unit 8 of the game machine 1 function. If the game software GSW is applied to the game machine having no both programs, it is preferable that the game software GSW has both programs.

The game software GSW has a hierarchical structure shown with a broken line, which is made by classifying tasks produced when operating the CPU 2 according to the above-mentioned respective programs. With the game software GSW, a multitask processing is possible as if a plurality of programs were simultaneously executed by controlling the task processing by a multitask operating system (multitask OS) (not shown).

FIG. 2 conceptually shows the hierarchical structure of the task control of the game software GSW. Determination of processing order and various kinds of interruption handling are possible with the more complex hierarchical structure of the actual game software GSW and the other programs (not shown), but the explanation thereof is omitted and is not shown for easy understanding. Arrows connecting the respective programs in FIG. 2 are shown in order to easily understand the invention. So, exchange of information or operational processing between the respective programs is not limited by these arrows.

And, various kinds of data of the game software GSW may be stored in any form as long as the data is freely read out through the program function of the game software GSW. As the present embodiment, these data are stored in the memory disc 6 together with the programs of the game software GSW. Alternatively, these data may be stored in an outside memory means, and may be downloaded to a memory, such as the RAM 5, through a communication medium means, such as the Internet, by the read program set in the game software GSW.

Generally, the CPU 2 processes on the basis of the respective programs of the game software GSW and produces tasks, and the game software GSW functions thereby. But, in the following explanation, "the program functions" omitting these operations for easy explanation.

Subsequently, operations of the game software GSW are now explained, referring to the drawings. When a player turns the power of the game machine 1 on, the game machine 1 reads the memory disc 6 in which the game software GSW is stored through the memory disc reader 7 and stores the game software GSW (including the OS (not shown) and a task controlling program) in the RAM 5. Then, the game software GSW stored in the RAM 5 is booted by the operating system stored in the ROM 4.

When stating the game by the player, a program (not shown) functions in response to the operation input through the controller 14, a story of the game is developed, and a so-called action shooting game wherein the player beats an opposing character by a gun starts.

Then, the polygon location program 28 firstly functions, and set a virtual space defined by three dimensional coordinates (such as x-coordinate, y-coordinate and z-coordinate), reads data of a polygon model, which is an aggregation of many polygons, out of the polygon data 30 according to the operation input by the player through the controller 14 which is detected by the function of the operational input detecting program 22, and locates many polygons in the virtual space.

Detailedly speaking, the polygon models, such as a floor F1, walls Wa1 and Wa2, a ceiling Ce, windows Wi1, Wi2 and Wi3, a door Do, lights Li1 and Li2, partitions P1 and P2, tables T1, T2, T2, T3, T4 and T5, and enemy characters CR1 and CR2 as shown in FIGS. 3 through 5, are computed on the basis of the operation input by the player and are located in the virtual space. And, the polygon model of an aim SC at which the player aims with a gun, that is, the aim SC corresponding to a gaze point to be gazed by the player is located in the virtual space on the basis of the operation input by the player through the controller 14.

Then, the gaze position computing program 29 functions, and a gaze position Zf is computed as a depth from a view position referred hereinafter to the polygon on a line of an axis of a camera (on the straight line in field of view direction of a view point ), that is, the position in the virtual space, such as a head of the enemy character CR1 (that is, the position of the gaze point).

The above-mentioned game machine 1 has the Z-buffer program 27 and the transparentizing program 21. When the Z-buffer program 27 functions, a view point and a direction of a field of view in the virtual space are determined, and a screen plane perpendicular to the direction of a field of view is virtually set at a position a predetermined distance away from the view point. Subsequently, a planar perspective transformation is executed with a so-called Z-buffer method in such a way that each Z-value, distance between the view point and each polygon in the virtual space in a depth direction is computed on the basis of a so-called screen transformation matrix, and only the polygons the Z-values of which are small are selected from the polygons on a straight line connecting a pixel on the screen plane and the view point so as to draw on the screen plane.

Then, the coordinate transformation computing program 26 functions, and a coordinate transformation is executed in such a manner that a screen transformation matrix M for representing the planar perspective transformation in case of a normal three-dimensional drawing which is multiplied by a scaling matrix Sm ($256^2$/Zf), that is, a value (Sm×M) is adopted as the screen transformation matrix in the present embodiment. In other words, when representing the above-mentioned with an expression, (X', Y', Z')=(X, Y, Z)·(Sm× M) if the point before the perspective transformation is (X, Y, Z ), and the point after the perspective transformation is (X', Y', Z'). This is shown, omitting parallel displacement elements in order to simplify the explanation.

Subsequently, the transparentizing program 21 functions, and an α value is determined concerning each point (X', Y', Z') obtained with the above-mentioned matrix (Sm×M). In the present embodiment, the α value was determined by the following expression.

$$\alpha=(Z'/256) \bmod 256 \qquad (1)$$

For instance, the drawn image is processed so as to become transparent if the α value is 255, and so as to become opaque if the α value is 0 (zero) and so as to have gradual transparency if the α value is 1 through 254. In the present embodiment, the expression (1) for determining the α value corresponds with the computation processed on the hardware side, such as a graphic board. Such a processing is standard, and so, is used as a drawing effect in many cases. And, this processing has such advantages that the burden on a CPU is rather light due to the processing by a hardware and speedy processing is possible. On the contrary, this processing can not used for a new or special processing in many cases because of the standard processing. In the present embodiment, the above-mentioned expression (1) can be used for a new or special processing with the matrix Sm.

The transparency to be processed with the a value is transparent if the α value is 255 and is opaque if the α value is 0 (zero). And, the greater part wherein the α value is 1 (one) through 254 is semi-transparent, so both transparent processing and opaque processing are referred to as semi-transparent processing in the specification.

Subsequently, how to produce a first image 40-1 is now explained. If the first image producing program 24 functions, the view point position in the virtual space is computed and determined on the basis of the operational input by the player. Then, the planar perspective transformation is executed, making use of the above-mentioned matrix (Sm× M) by operating the coordinate transformation computing program 26.

When transforming a Z-value of the polygon which has the Z-value the same as the gaze point position Zf computed by the gaze position computing program 29, the transformed value Z' is $256^2$ by multiplying by ($256^2$/Zf) with the matrix (Sm×M). When obtaining the α value by applying the expression (1), the value is 0 (zero).

When transforming the Z-value of the polygon which has the Z-value bigger than the gaze position Zf, that is, the Z-value of the polygon which is located on the back side of the gaze position in the virtual space with respect to the view position, the transformed value Z' is bigger than $256^2$ by multiplying by ($256^2$/Zf) with the matrix (Sm×M). When thus obtaining the α value by applying the expression (1), the value is 1 (one) or more (The transformed value Z' is set to be $256^3-1$ at the most due to the setting of the world coordinates. That is, the maximum α value is 255.).

An explanation is given with the first image 40-1 as shown in FIG. 3. If the Z-value of a B point on the wall Wa1 is the same as one of the gaze position corresponding to the aim SC (the same distance from the view point, the gaze position Zf), the Z-value of the B point of the wall Wa1 is converted into $256^2$, and the α value of this point becomes 0 (zero) with the expression (1). And, the Z-value of the polygon forming an A point on the wall Wa1 is on the front side with respect to the gaze position, so that the α value is set without condition.

In another embodiment, the front side may be similarly shaded off. In this case, the following expression may be applied.

$$\alpha=255-[\{(Z'/256)-1\}\bmod 256] \qquad (2)$$

Only the front side concerning the gaze position may be shaded off by applying only the expression (1), or the front and the back sides of the gaze position may be shaded off by applying both expressions (1), (2). Alternatively, only the front side with respect to the gaze position may be shaded off by applying only the expression (2).

The Z-value of the polygon forming a C point of the wall Wa1 which is on the back side in comparison with the gaze position Zf on the basis of the view point is bigger than $256^2$ since it is on the back side of the gaze position, so that the α value is 1 (one) or more.

With the function of the coordinate transformation computing program 26, the Z-value is given to each polygon positioning in the depth direction with respect to the gaze position Zf so as to gradually make the α value bigger. By doing so, the polygon positioning in the depth direction with respect to the gaze position Zf is automatically processed to be gradually transparent as the polygon approaches the rear side by the function of the transparentizing program 21.

The Z-value of each polygon which was multiplied by the matrix Sm is not changed in the size of the value. For this reason, the first image 40-1 as shown in FIG. 3 which is a planar image is produced with no special operation without changing the front and the rear positions at the time of planar perspective transformation with the function of the Z-buffer program 27. After producing the first image 40-1 with the function of the first image producing program 24 in the above-mentioned way, it is stored in the video area in the RAM 5.

Subsequently, how to produce a second image 40-2b is now explained. If the second image producing program 23 functions, the first image 40-1 (see FIG. 3) produced by the function of the first image producing program 24 which is Lw1 wide and Lh1 long is reduced so as to produce a reduced image 40-2a which is Lw2 wide (a half of Lw1) and Lh2 long (a half of Lh1 ), as shown in FIG. 4(a). Next, the reduced image 40-2a is enlarged so as to produce the second image 40-2a which is Lw1 wide and Lh1 long, having the size the same as the first image 40-1. The produced image is stored in the video area inside the RAM 5.

By doing so, four pixels of the first image 40-1 are reduced to one pixel and then, the reduced is returned to the four pixels again, so that the quality of the image deteriorates as shown with broken lines in FIG. 4(*b*) and the second image 40-2*b* having the same size as the first image 40-1 can be obtained. The α value is not set on the second image 40-2*b*.

The reduced image 40-2*a* may be produced by any degree of reduction as long as the second image 40-2*b* can be produced so as to have the same size as the first image 40-1. In the present embodiment, the quality of image is deteriorated by the reduction and then, enlargement of the first image 40-1. But, this method is not only one. The image may be deteriorated by any method, such as reduction of colors, Anti Aliasing, blur, compression of data, change of pixel unit.

After producing the first image 40-1 by the first image producing program 24 and the second image 40-2*b* by the second image producing program 23 in this way, the synthetic image producing and displaying program 20 functions and the first image 40-1 is put on the second image 40-2*b* so that both images are combined.

When the transparentizing program 21 functions, a display image 40-3 is produced as shown in FIG. 5 by combining the first and second images in such a way that semi-transparentizing processing is executed on (the images of) the polygons on the back side of the gaze position of the first image 40-1 on the basis of the Z-values given to the respective polygons of the first image 40-1 by the coordinate transformation computing program 26, and the second image 40-2*b* positioning on the lower side is processed so that (the images of) the polygons positioning in the rear direction with respect to the aim SC become gradually transparent as the polygon approaches the rear position.

In other words, 100% of the first image 40-1 is drawn on an A-point and a B-point of the wall Wa1 in the first image 40-1 since the α value of the polygons comprising the A- and B-points is 0 (zero) which means opaque, as shown in FIG. 5. And, 50% of the first image 40-1 and 50% of the second image 40-2*b* are respectively drawn on a C-point of the wall Wa1 in the first image 40-1 since the α value of the polygon comprising the C point is 128 which means 50% of transparency, that is, semi-transparent. Furthermore, 100% of the second image 40-2*b* is drawn on a D-point of the wall Wa2 in the first image 40-1 since the α value of the polygon comprising the D-point is 255 which means transparent.

Detailed speaking, the positions of the wall Wa1, the partition P2, the floor F1 and the ceiling Ce gradually get blurred as the position approaches the rear side in comparison with the enemy character CR1 which is the aim SC. And, the light Li1, the table T4, the table T2, the light Li2, the table 5, the door Do and the enemy character CR2 get blurred, gradually in its order. The wall Wa2, the window Wi1, the window Wi2 and the window Wi3 are fuzziest.

The second image 40-2*b* quality of image of which deteriorates is gradually drawn as the position approaches the rear side concerning the gaze position, so that (the image of) the polygon positioning on the rear side with respect to the aim SC can be shaded off as it is out of focus.

According to the game software GSW according to the invention as mentioned before, the second image producing program 23 deteriorates the quality of the first image 40-1 produced by the first image producing program 24 and produces the second image 40-2*b* so as to have the same size as the first image 40-1, and the synthetic image producing program 20 combines the first image 40-1 and the second image 40-2*b* in order to produce the display image 40-3 so that (the image of) each polygon of the first image 40-1 is displayed around the gaze position which was computed by the gaze position computing program 29, that is, the depth position of the aim SC, and semi-transparent processing is executed on the first image 40-1 so that (the image of) each polygon of the second image 40-2*b* can displayed as the polygon approaches the rear side concerning the aim SC. By doing so, the image of the polygon to be displayed can be shaded off as the position approaches the rear side concerning the aim SC, thereby giving the player real mood and increasing the fun of the game.

The display image 40-3 is preferably produced sixty (60) times per second, for instance, for responding to the operation input by the player through the controller 14, and it is preferably prevent the production of the image from taking more time than 1/60 second so as not to display the image after 1/30 second (that is, the second scene of image) due to the delay of operation. But, according to the game software GSW, the second image producing program 23 reduces the first image 40-1 so as to have a predetermined size, thereafter recovers the image in order to deteriorate the quality of the first image 40-1, and produces the second image 40-2*b* having the same size as the first image 40-1, so that the second image 40-2*b* can be produced by deteriorating the quality of the first image 40-1 without newly producing the second image 40-2*b*. That is, the second image 40-2*b* can be relatively simply produced without widely increasing operation, thereby preventing drawing speed from lowering, such as preventing the display image 40-3 from being produced after 1/60 second or more. Besides, it is possible to prevent the operation power of the CPU 2 necessary for other programs of the game software GSW from being widely limited, and to prevent the execution speed of the game itself from lowering.

Furthermore, the gaze position computing program 29 computes the depth position of the gaze point with the Z-value, and the coordinate transformation computing program 26 perspectively transforms the polygons onto a planar screen in such a way that the Z-value of the polygon, which is at the gaze point, is transformed into one having no transparency and the Z-value of the polygon, which is bigger than one of the gaze point, is transformed into one gradually increasing transparency, starting from one having low transparency. Therefore, the synthetic image producing program 20 can apply semi-transparentizing processing to the first image 40-1 with the transparentizing program 21 of the game machine 1 although the Z-buffer program 27 of the game machine 1 can perspectively transform the respective polygons onto a plane, so that the display image 40-3 can be relatively easily produced by combining the processed first image 40-1 and the second image 40-2*b* without widely increasing operation. Then, the executing speed of the game and the drawing speed of the display image 40-3 can be prevented from lowering.

In the present embodiment according to the invention, semi-transparentizing processing is executed only on the first image 40-1, and such processed first image 40-1 and the second image 40-2*b* are combined. This method is not only one. On the contrary, semi-transparentizing processing may be executed on the second image 40-2*b*, and thereafter, the second image 40-2*b* and the first image 40-1 may be combined. Furthermore, another choice is that semi-transparentizing processing may be executed on both first and second images 40-1, 40-2*b* so as to be combined. At this time, the combination is possible in such a way that (the images of) the polygons of the first image 40-1 which are on the rear side with respect to the gaze point are gradually made transparent and (the images of) the polygons of the second image 40-2b which are on the rear side with respect to the gaze point are gradually made opaque.

And, in the present embodiment, the game machine 1 has the Z-buffer program 27 and the transparentizing program 21. When applying the game software GSW to the game machine 1 having no both programs, both programs may be stored in the game software GSW. Furthermore, planar perspective transformation may be executed by another methods excluding the Z-buffer method even if the game machine 1 has no Z-buffer program 27.

Besides, in the present embodiment, semi-transparentizing processing is applied only to the polygons which are on the rear side concerning the gaze point. When applying semi-transparentizing processing also to the polygons which are on the front side concerning the gaze point, so that (the images of) the polygons on both front and rear sides concerning the gaze position can be shaded off. Furthermore, (the images of) the polygons on the front side concerning the gaze position may be shaded off as a method of representing a long-sightness state.

In the present embodiment, the invention was applied to a so-called action shooting game for attacking an opposing enemy character with a gun. But, the invention can be applied to any game as long as a display image with a so-called 3DCG is displayed in the game and a gaze point is produced in the virtual space. And, the present embodiment refers to the game wherein the image as a gaze position is displayed. But, any image is available as the gaze position. Furthermore, the invention can be applied to the game having no image for representing the gaze point since only portion as the gaze position can be made clear by shading off the images on both front and rear sides concerning the portion to be gazed.

Besides, the game software GSW in the present embodiment functions with the game machine 1 for home use, but may function with the game machine, such as a so-called arcade game machine.

Besides, the invention can be utilized as the game software to be used for a game computer, such as a game machine for home use, and a game machine for an arcade, and a computer, such as a personal computer and a mobile phone. Furthermore, the computer to which the game software according to the invention is loaded may be utilized as a game machine.

The present invention has been explained on the basis of the example embodiments discussed. Although some variations have been mentioned, the embodiments which are described in the specification are illustrative and not limiting. The scope of the invention is designated by the accompanying claims and is not restricted by the descriptions of the specific embodiments. Accordingly, all the transformations and changes within the scope of the claims are to be construed as included in the scope of the present invention.

The invention claimed is:

1. A game program stored in computer-readable storage medium for getting a computer to produce a display image by perspectively transforming many polygons located in a virtual space onto a plane on the basis of a view position so as to represent on a display and to produce a gaze position at which a player should gaze in said virtual space so as to represent on said display, comprising:

said game program being a program for instructing said computer to function as the following means, comprising:

polygon locating means for locating said many polygons in said virtual space in response to an operation input by said player through an operation portion;

first image producing means for producing a first image in such a way that a Z value of each said polygon is computed as a depth direction rather than said view position on the basis of three-dimensional coordinates given to said virtual space, and a plane perspective transformation is executed by coordinate converting only said polygons which Z values are small onto a screen plane on the basis of a screen conversion matrix M;

gaze position computing means for computing a depth position of said gaze position with respect to said view position as a Z value of said gaze position;

said first image producing means having the following means:

coordinate conversion means for converting a coordinate before perspective transformation $(X, Y, Z)$ into a coordinate after perspective transformation $(X', Y', Z')$ by an equation $(X', Y', Z') = (X, Y, Z) \times (S_m \times M)$ wherein said screen transformation matrix M is multiplied by a scaling matrix $S_m$ which value is $[256^2/(Z \text{ value of said gaze position})]$, when executing plane perspective transformation onto said screen plane by computing coordinate transformation on the basis of said screen transformation matrix M;

transparency computing means for computing transparency $\alpha$ for said polygons which are located on a back side rather than said gaze position with respect to said coordinate $(X', Y', Z')$ of each polygon on which coordinate transformation is executed onto said screen plane by said coordinate conversion means with an equation $\alpha = (Z'/256) \bmod 256$;

said game program being a program for further instructing said computer to function as the following means:

second image producing means for deteriorating a quality of said first image produced by said first image producing means to produce a second image so as to have a size the same as said first image; and synthetic image producing means for applying semi-transparentizing processing to said first image on the basis of said transparency $\alpha$ which was computed on each said polygon so that each polygon of said first image can be displayed around said depth position of said gaze position which was computed by said gaze position computing means and each polygon of said second image can be displayed as said polygon approaches a rear side concerning said gaze position, and for combining said first and said second images so as to produce said display image.

2. The game program stored in computer-readable storage medium according to claim 1, wherein said second image producing means reduces said first image so as to have a predetermined size and then recovers said reduced image in order to deteriorate said quality of said first image, and produces said second image having the same size as said first image.

3. The game program stored in computer-readable storage medium according to claim 1, wherein said transparency computing means computes said transparency $\alpha$ for said polygons which are located on a front side rather than said gaze position with respect to said coordinate $(X', Y', Z')$ of each said polygon on which coordinate transformation is executed onto a screen plane by said coordinate conversion means with an expression $\alpha=255-[\{(Z'/256)-1\}\bmod 256]$, and said synthetic image producing means applies semi-transparentizing processing to said first image on the basis of said transparency $\alpha$ which was computed for each said polygon so that each polygon of said first image can be displayed around said depth position of said gaze position and each polygon of said second image can be displayed as said polygon leaves a front side concerning said gaze position, and combines said first image with said second image so as to produce said display image.

4. A game machine for producing a display image by perspectively transforming many polygons located in a virtual space onto a plane on the basis of a view position so as to represent on a display and for producing a gaze position at which a player should gaze in said virtual space so as to represent on said display, comprising:

polygon locating means for locating said many polygons in said virtual space in response to an operation input by said player through an operation portion;

first image producing means for producing a first image in such a way that a Z value of each said polygon is computed as a depth direction rather than said view position on the basis of three-dimensional coordinates given to said virtual space, and a plane perspective transformation is executed by coordinate converting only said polygons which Z values are small onto a screen plane on the basis of a screen conversion matrix M;

gaze position computing means for computing a depth position of said gaze position with respect to said view position as a Z value of said gaze position;

said first image producing means having the following means:

coordinate conversion means for converting a coordinate before perspective transformation (X, Y, Z) into a coordinate after perspective transformation (X', Y', Z') by an equation $(X', Y', Z')=(X, Y, Z)\times(S_m\times M)$, wherein said screen transformation matrix M is multiplied by a scaling matrix $S_m$ which value is $[256^2/(Z\text{ value of said gaze position})]$, when executing plane perspective transformation onto said screen plane by computing coordinate transformation on the basis of said screen transformation matrix M;

transparency computing means for computing transparency $\alpha$ for said polygons which are located on a back side rather than said gaze position with respect to said coordinate (X', Y', Z') of each polygon on which coordinate transformation is executed onto said screen plane by said coordinate conversion means with an equation $\alpha=(Z'/256)\bmod 256$;

said game matching further having the following means:

second image producing means for deteriorating a quality of said first image produced by said first image producing means to produce a second image so as to have a size the same as said first image; and synthetic image producing means for applying semi-transparentizing processing to said first image on the basis of said transparency $\alpha$ which was computed on each said polygon so that each polygon of said first image can be displayed around said depth position of said gaze position which was computed by said gaze position computing means and each polygon of said second image can be displayed as said polygon approaches a rear side concerning said gaze position, and for combining said first and said second images so as to produce said display image.

* * * * *